May 18, 1965  P. J. BROWNSCOMBE  3,183,767
PHOTOGRAPHIC REPRODUCTION MACHINES
Filed Aug. 30, 1961  5 Sheets-Sheet 1

INVENTOR:
PHILIP J. BROWNSCOMBE
BY Marshall, Johnston
Cook & Root
ATT'YS

May 18, 1965 P. J. BROWNSCOMBE 3,183,767
PHOTOGRAPHIC REPRODUCTION MACHINES
Filed Aug. 30, 1961 5 Sheets-Sheet 2

INVENTOR:
PHILIP J. BROWNSCOMBE
BY
ATT'YS

May 18, 1965 P. J. BROWNSCOMBE 3,183,767
PHOTOGRAPHIC REPRODUCTION MACHINES
Filed Aug. 30, 1961 5 Sheets-Sheet 4

INVENTOR:
PHILIP J. BROWNSCOMBE
BY
ATT'YS

May 18, 1965 P. J. BROWNSCOMBE 3,183,767
PHOTOGRAPHIC REPRODUCTION MACHINES
Filed Aug. 30, 1961 5 Sheets-Sheet 5

INVENTOR:
PHILIP J. BROWNSCOMBE
BY
ATT'YS

United States Patent Office 3,183,767
Patented May 18, 1965

3,183,767
PHOTOGRAPHIC REPRODUCTION MACHINES
Philip J. Brownscombe, Millington, N.J., assignor to Eugene Dietzgen Co., Chicago, Ill., a corporation of Delaware
Filed Aug. 30, 1961, Ser. No. 134,876
8 Claims. (Cl. 88—24)

This invention, in general, relates to photographic reproduction machines and, more particularly, relates to machines for the photographic reproduction of markings, printing, drawings, etc. on copy sheets and the like onto light-sensitive paper, film or the like. The invention especially relates to machines in which the image reproduced on the light-sensitive paper is enlarged or reduced relative to the size of the image on the copy sheet.

Briefly, the photographic machines of the invention comprise a cabinet containing an image-exposure section wherein the material to be reproduced is fed. This section is lighted. The image on the paper is reflected inside the cabinet by a folded mirror system including a lens to an image-recording section wherein it is reproduced on photographic paper.

One of the salient features of the invention is a combination wherein the copy sheet is conveyed through the exposure section of the machine on the surface of the rotating roller. The arc image of the copy sheet on this roller is directed by a mirror system which may contain a reducing or enlarging lens to the exposure section of the machine which constitutes the camera containing the light-sensitive paper. The light-sensitive paper is conveyed in exposure of the image to the copy sheet in the form of an arc over the surface of a roller or a fixed, curved surface at a velocity correlated to the velocity at which the copy sheet passes through the exposure section. By the utilization of the principles hereinafter described, clear, sharp reproductions which may be either enlarged or reduced are obtained on the light-sensitive paper.

One of the primary objects of the invention is to provide a photographic reproduction machine or recording camera in which the copy sheet is conveyed through the exposure section on a rotating drum and the exposed image of the moving copy sheet is faithfully recorded on light-sensitive sheeting in the camera section. This objective can best be attained by the synchronization of the rate at which the light-sensitive sheeting travels through the camera with the rate at which the copy sheet is fed through the exposure section while correlating the rates with the amount of linear reduction or enlargement of the image recorded on the light-sensitive sheeting.

In some known recording cameras, the copy to be reproduced and the light-sensitive paper or film are held in flat or substantially flat planes during the recording. In other known cameras, the original copy or the light-sensitive paper or film is passed around a cylindrical surface during the recording while the other is maintained flat. This combination presents no serious problem so long as the recording aperture is narrow and the arc of the curve being imaged for recording is very small compared to the cylinder circumference. Serious problems do arise, however, when cameras of this type are used to record on a larger arc. Cases of this type arise where the imaged arc has to be relatively large to obtain proper exposure on comparatively insensitive photographic emulsions or where a small lens aperture is necessary. In such cases, distortion of the image in recording a flat image on curved film, or vice versa, becomes a problem.

In the camera of the invention, distortion or smearage of the image recorded from a moving copy sheet to a moving light-sensitive sheet is eliminated by recording from one curved form to another curved form. The movement of the exposed copy sheet is at an angular velocity equal to the angular velocity of the moving light-sensitive paper or film of the camera. The ratio of arc radius of the copy sheet to the arc radius of the light-sensitive sheet equals the ratio of linear reduction of the original image to the reproduced image. As an example, when the linear dimensions of the copy sheet image is twice the linear dimensions of the recorded image, the arc radius of the copy sheet is twice the arc radius of the light-sensitive sheet. While the cameras of the invention are primarily useful in producing reduced size copies, they may be used in producing copies of the same size or of a larger size. Where the copies are the same size as the original, the arc radii are the same. Where the copies are of a larger size than the original, the ratio of the arc radius of the light-sensitive sheet to the arc radius of the copy sheet is equal to the ratio of linear enlargement.

The basic reasoning for recording in the manner described in accordance with this invention from one arc to another arc instead of a flat surface to another flat surface is to avoid mechanical complications and operating difficulties observed with the latter type of photographic reproduction machines. The major difficulties with these machines occur in two places, at the exposure area of the original copy and at the light-sensitive paper or film. When the original copy is pushed through a slit in the exposure section or is driven therethrough by belts, irregularities in driving speed occur and the copy is able to move up and down a short distance between its guides. These irregularities and movements have been found to be troublesome and prevent recording as sharp an image as a good lens is capable of producing. Furthermore, where high reduction ratios are involved, longitudinal vibrations within the film held in the flat plane can be very troublesome.

Another feature of the invention relates to the development of an interconnecting drive between the rotating drum in the exposure section of the machine and the drive by which the camera is operated to cause the film to be moved through the camera at a speed correlated with the speed at which copy sheet is fed through the exposure section. For the sharpest reproduction of the copy image, the movement of the light-sensitive sheet through the camera must be carefully synchronized with the movement of the copy sheet through the exposure section. It has been observed, especially at high reduction ratios, that geared drives connecting the drum of the exposure section and the drive for the camera do not give a satisfactory smooth drive because of the slight variations in angular velocities as the gear teeth engage and disengage. There has been devised for this invention a pulley drive system connecting the drum of the exposure section and the drive for the paper camera wherein the pulleys are provided with a continuous metal band held under relatively high tension. The metal band under tension eliminates better than any type of drive tested the possibility of variations in angular velocities between the angular velocity of the drum and the angular velocity of the paper camera drive. The pulley drive system with the metal band under tension responds well in instances where the motor drive for the revolving drum in the exposure section might fluctuate due to momentary current fluctuation, in which case the camera drive should speed up or slow down in accordance with the change in angular velocity of the revolving drum.

Having briefly described some of the salient features of the invention, the specific embodiment thereof in its various aspects is illustrated in the accompanying drawing and described hereinafter in detail. Other embodiments of the invention employing the same or equivalent principles as herein taught, may be used and structural changes may be made as desired by those skilled in the art without departing from the true spirit and principles of the invention.

Figure 1:
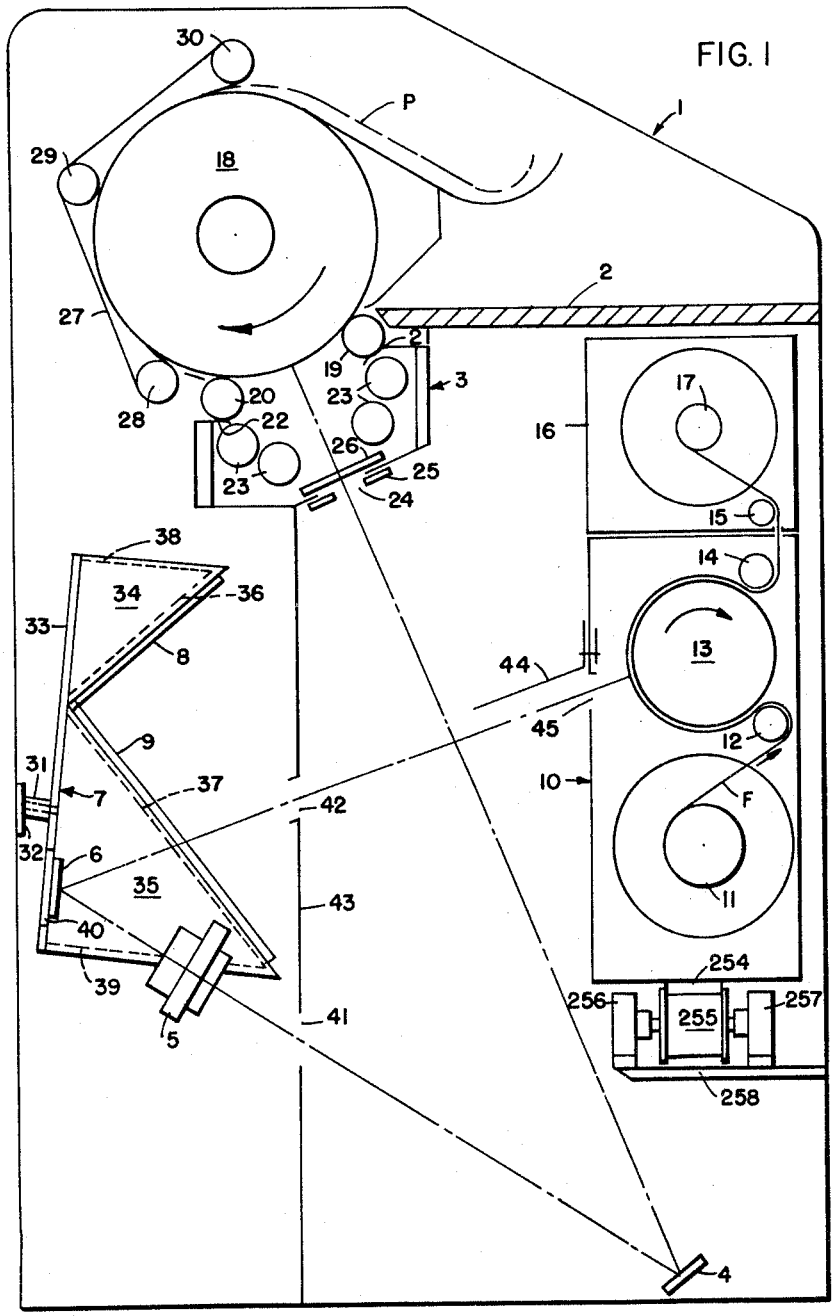
FIG. 1 is a diagrammatic illustration in side elevation of a photographic reproduction machine in which the principles of the invention may be applied.

The over-all photographic reproduction machine is depicted diagrammatically in FIG. 1 wherein the numeral 1 designates the cabinet in which the component parts of the machine are housed. The front upper portion of the cabinet has a paper feed board 2 upon which is laid the paper to be fed through the machine and photographed. Briefly, the components of the machine comprise an exposure chamber 3 from which the image to be photographed is taken. The image from the exposure chamber 3 is reflected by an elongated planar mirror 4 through a lens 5 to a planar mirror 6. The planar mirror 6 is mounted on the pivotally mounted mirror frame 7. The lens 5 is used to enlarge or reduce the image size between exposure section 3 and the camera section 10.

The pivotally mounted frame 7 also has a pair of planar mirrors 8 and 9 thereon. These planar mirrors are at right angles to each other with their line of intersection lying in the plane of the mirror 6. The frame 7 is pivotable over a 90° arc whereby either the mirror 6 or the mirror 8 lies in the focal zone of the lens 5. In the embodiment shown, when the mirrors 4 and 6 comprise the folded mirror system, the image produced on the light-sensitive paper is a reverse reading image, i.e., reading from right to left. When the mirror 8 is rotated into the focal zone of the lens 5, the image is reflected from the mirror 8 to the mirror 9 and thence to the camera section 10. This gives a three component folding mirror system and results in a right-reading image on the light-sensitive paper or film. This mirror system is described in further detail in my copending application Ser. No. 134,877, filed concurrently herewith, the disclosure of which is incorporated herein by reference as if it had been set forth in its entirety.

The camera section or image reproduction section 10 comprises a feed roll 11 containing the light-sensitive paper or film. This film passes from the feed roll 11 over a roller 12 and thence about the surface of a rotatably driven roller 13 upon which the paper is exposed to the reflected image from the exposure section 3. The exposed paper then passes around roller 14 and over roller 15 into the magazine section 16 of the camera. The exposed light-sensitive paper or film is then wound on the roller 17 in the magazine section 16. The magazine section 16 preferably is a separate component from the exposure section 10 so that the exposed light-sensitive paper or film can be removed. The details for this segment of the reproduction machine are described in greater detail hereinafter.

The basic components of the exposure section 3 comprise a rotatably driven roller 18 preferably having V-shaped grooves on the surface thereof. The surface of the roller 18 is a reflective surface, i.e., a white reflective surface. A pair of freely rotatable rollers 19 and 20 ride on the surface of the roller 18. These rollers extend along the length of the roller 18 and have elongated strips of flexible, resilient material 21 and 22 pressing against their surface. The exposure chamber 3 contains a series of elongated lighting tubes 23 designed to provide the desired type of light in the exposure section 3. The side of the housing of the exposure section 3 opposite the roller 18 has an elongated opening 24 provided with a pair of shutter plates 25 which can be moved to enlarge or narrow the elongated slit 24 in the exposure section 3. The opening or slit 24 of the housing is covered with a glass plate 26.

The housing comprising the exposure section 3 thus is made substantially airtight. The purpose of this construction is to provide an exposure section 3 into which air may be blown by means not shown. The rollers 19 and 20 and flexible, resilient strips 21 and 22 provide substantially airtight joint between the housing of the exposure section 3 and roller 18 when original copy paper is passed from the feed board into the exposure section 3 along the surface roller 18. The air pressure holds the paper in tight, non-vibrating relationship against the surface of the roller 18. The details of the exposure section are described in greater detail in another of my copending applications filed concurrently herewith.

The original copy, after leaving the exposure section 3, is picked up by a series of cloth bands or belts 27 which pass over the rollers 28, 29 and 30 on the rear face of the roller or drum 18, after which the original copy P is discharged from the machine.

One convenient way for making the frame 7 for the mirrors 6, 8 and 9 is shown in FIG. 1. The frame is pivotally mounted in the pivot hub 31, whose base 32 is attached to the frame of the cabinet 1. The frame of the mirror system comprises a back plate 33 having triangular plates 34 and 35 attached to opposite edges thereof. A pair of mirror mounting plates 36 and 37 at right angles to each other extend between the plates 34 and 35, respectively. Similarly, a pair of end plates 38 and 39 extend between the triangular side plates 34 and 35, respectively. The plate 33 has an outwardly extending segment 40 upon which is mounted the planar mirror 6.

The reproduction machine operates in the following manner. The original copy is slid along the feed board 2 by hand until its leading edge is picked up between the rollers 18 and 19. As the original copy passes through exposure section 3, its image is projected through the opening or slit 24 toward the elongated mirror 4 near the bottom of the cabinet. The image is reflected from the mirror 4 to the lens 5 which serves the function of either enlarging or reducing the image size which is reflected from mirror 6 to the light-sensitive paper or film on the roller 13 of the reproduction or camera section 10. The cabinet of the reproduction machine preferably is provided with a non-reflective divider plate 43 having slits 41 and 42 through which passes the reflected light. This helps to minimize the diffusion of the stray light from exposure section 3 onto the photographic paper or film. The camera section 10 has a light shield 44 above its opening 45 for this same purpose.

When the mirror frame 7 is rotated 90° to replace the mirror 6 with the mirror 8 in the focal zone of the lens 5, the light rays from the lens 5 falling on the mirror 8 are reflected laterally to the mirror 9, from which they are reflected through the opening 45 of the camera section 10 onto the light-sensitive paper or film. The reflected rays are laterally displaced as compared with the reflected rays from the mirror 6 and, hence, the camera section must be shifted a corresponding amount when the mirror system is changed from a right-reading to a reverse reading system. This aspect is described in detail in my aforesaid copending application.

Figure 2:
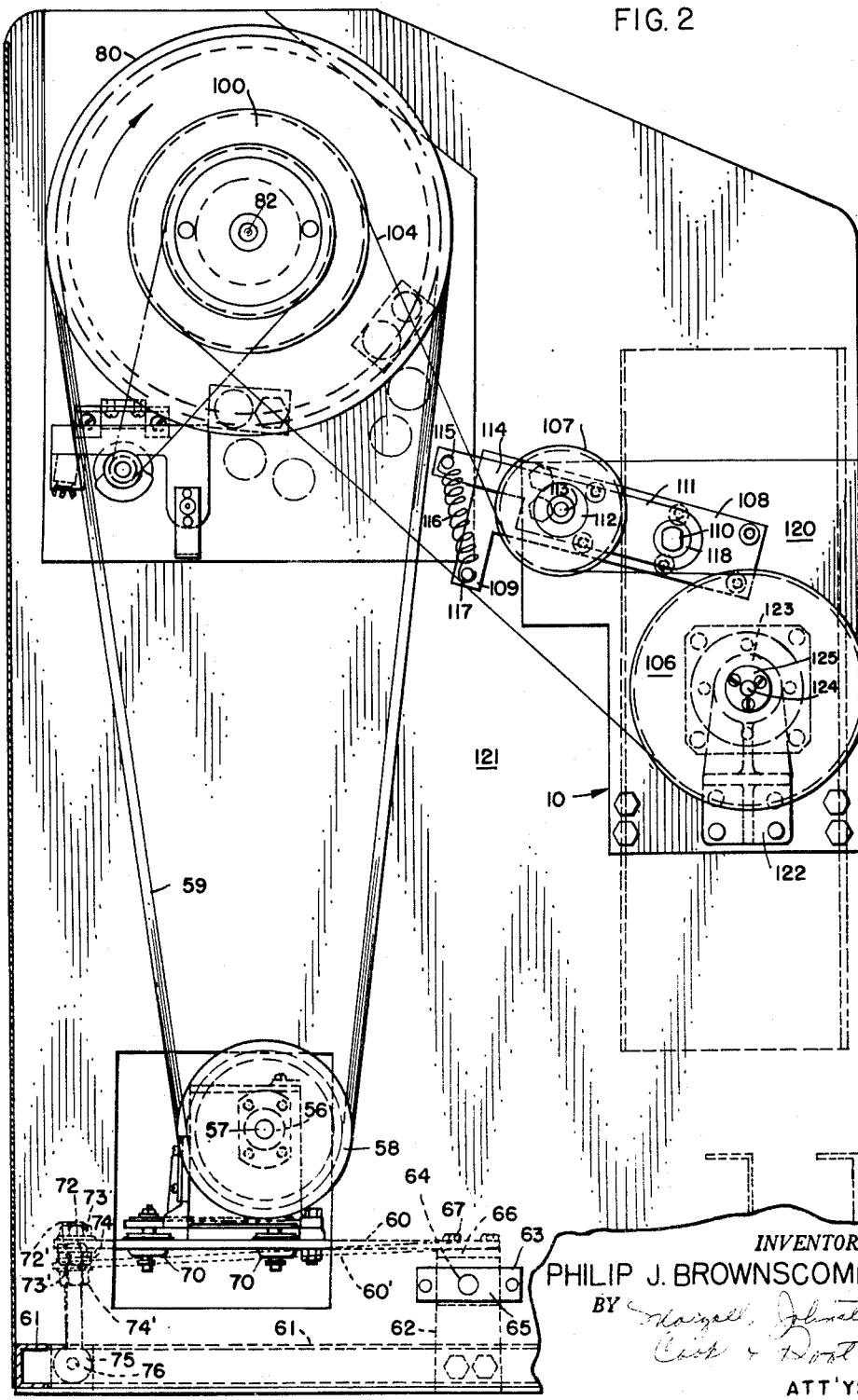
FIG. 2 is a side elevation of the motor drive for the revolving drum of the exposure section and an interconnecting pulley-steel band drive between the revolving drum and the image reproduction or camera section of the machine.
Figure 3:
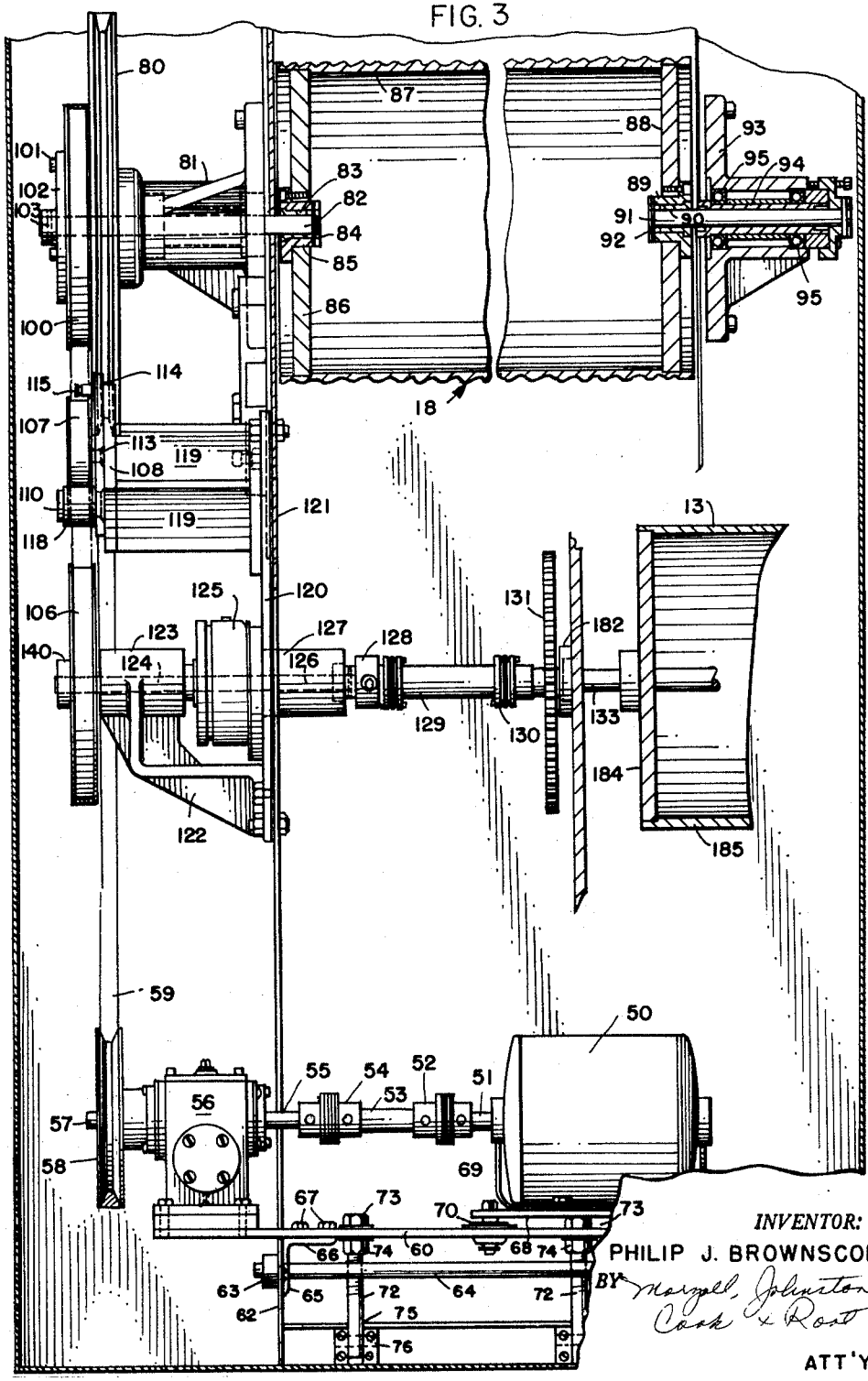
FIG. 3 is a front elevation showing the motor drive and interconnecting drive of FIG. 2.

Having briefly described the over-all reproduction machine, reference is now made to FIGS. 2–5 which illustrate in detail the structure of the reproduction machine directly germane to the claimed invention. FIGS. 2 and 3 show the drives for the drum 18 of the exposure section and the roller of the camera section. For this purpose, there is provided near the bottom of the cabinet of the machine an electric motor 50 whose drive shaft 51 is coupled by couplings 52 and 54 with an interconnecting shaft 53 to the driven shaft 55 of reduction gear box 56. A V-belt pulley 58 is mounted on the drive shaft 57 of the gear box 56. The V-belt pulley serves as the drive pulley for the V-belt 59.

The motor 50 and the gear box 56 are mounted on a platform 60. The platform 60 is pivotally mounted on a pair of upstanding supports 62 bolted to the lower frame section 61 of the cabinet. These supports each have a plate 63 in which is mounted a shaft 64 extending therebetween. The platform 60 is pivotally mounted on the shaft 64 by means of a pair of right angle brackets 65 at opposite ends of the shaft 64, one leg of which is rotatably journalled with the shaft 64 and the other leg of which contains threaded holes 66 for the purpose of bolting the platform 60 to the bracket 65 by means of bolts 67.

The motor 50 has a mounting bracket 69 attached to a supporting plate 68, which, in turn, is mounted on the platform 60 by means of cushion mounting members 70 situated at the four corners of the supporting plate 68.

The purpose of the pivotal mounting of the platform 60 is to provide a means for adjusting and maintaining the desired amount of tension in the V-belt drive 59. This adjustment is achieved by the support of the outer end of the pivotable platform 60 on a pair of upstanding threaded shafts 72. Nut pairs 73 and 74 are threaded on the shafts 72 above and below the platform 60, which contains apertures through which the shafts 72 extend. The lower ends 75 of the shafts 72 comprise a disc-shaped portion with an aperture therein through which extends a shaft 76. The disc-shaped lower ends 75 are pivotable on the shafts 75 to permit pivotal movement of said shafts. Accordingly, the tension of the belt 59 can be adjusted by threading the nuts 73, 74 on the shafts 72 to raise or lower the pivotally mounted platform 60.

The V-belt 59 drives a pulley 80, whose shaft 82 is rotatably journalled in the journal hub 81. There is mounted on one end of the shaft 82 a bushing 83 and a hub 85, the latter of which is connected to the shaft 82 by means of a pin 84 extending through a hole in the shaft 82. The hub 85 is bolted to an end disc 86 of the roller 18. There is a similar end disc 88 at the opposite side of the drum 18 between which extends a hollow cylinder portion 87 of light reflective material. The outer surface of the cylinder 87 of the drum preferably has shallow V-shaped grooves with rounded corners to keep the drum side of the copy sheet at substantially atmospheric pressure in order to maintain a pressure differential for holding the paper tightly against the drum 18. These grooves should be relatively shallow in order to avoid shadow effects from showing up on the film or light-sensitive paper.

The disc 88 of the roller 18 is bolted to a hub 89. The hub 89 and bushing 90 are supported on the shaft 91 with the hub 89 being connected to the shaft 91 by means of a pin 92 extending therethrough. The shaft 91 and its bushing 94 are rotatably journalled in ball or roller bearings 95 provided in the hub 93.

Next to the pulley 80 there is a pulley 100 having a flat bottomed groove. The pulley 100 rotates with paper conveying drum 18 by virtue of its mounting on the hub member 102 by means of bolts 101 and the attachment of the hub to the shaft 82 by means of pin 103. The flat bottomed pulley 100 accommodates a metal band drive 104 and constitutes a part of a smooth, synchronous drive between the paper conveying drum 18 and the drive for drawing the light-sensitive paper or film through the camera section. The continuous metal band 104 passes about the pulley 106 at a side of the camera section 10. The pulley 106 has a flat bottomed groove and is of the same diameter as the pulley 100 so that the drum and the camera drive rotate at the same angular velocity.

In order to maintain tension in the metal band drive sufficient to insure against slippage of the metal band 104 on the pulleys 100 and 106, a flat bottomed grooved idler pulley 107 is employed. This idler pulley 107 rides on the upper stretch of the band 104 extending between pulleys 100 and 106. The pulley 107 is positioned in proper relationship to the metal band 104 by mounting it on a fixedly positioned plate 108 having a dependent arm 109. The plate 108 has a fixed shaft 110 extending therefrom, about which shaft 110 is pivotally supported a pivotal arm 111 and its journal hub 118. A shaft 113 is mounted on the arm 111 and the hub 112 of the pulley 107 is rotatably journalled thereon. The arm 111 has an extension 114 near the end of which there is provided a pin 115. A coiled, tension spring 116 has one end mounted over the pin 115 with the other end attached to the pin 117 on the depending segment 109 of plate 108. This spring draws the pivotable arm 111 downwardly and urges the idler pulley downwardly to provide tension in the metal band 104.

The plate 108 is mounted on the mounting plate 120 by means of a pair of supporting plates 119. The mounting plate 120, in turn, is mounted on the panel 121 of the machine. The plate 120 and the panel 121 have bolted thereon a mounting bracket 122 containing a journal hub 123 which rotatably supports an end of the shaft 124. Shaft 124 has a hub plate 140 attached to the pulley 106 so that the shaft 124 is rotatably driven by the pulley 106. The shaft 124 is connected with a clutch 125 which may be of any suitable construction. Conveniently, the clutch 125 is an electromagnetic clutch which engages and disengages by electrical impulse. Clutch 125 drives a shaft 126 rotatably journalled in journal bearing 127. The shaft 126 is connected by means of coupling 128 to an extendable drive coupling 129 of any suitable construction. The drive coupling 129 connects the output drive of the clutch 125 and the driven roller in the reproduction or camera section. Inasmuch as the latter must be shiftable to accommodate a displacement of the image upon changing from a right-reading to a reverse reading mirror system, or vice versa, in the manner previously described, the drive coupling 129 accommodates the linear shifting of the camera section, while maintaining the rotatable drive for the roller 13 of the camera section. The extensible drive coupling 129 is coupled by coupling member 130 to a shaft 133 upon which is mounted the gear 131.

Figure 4:
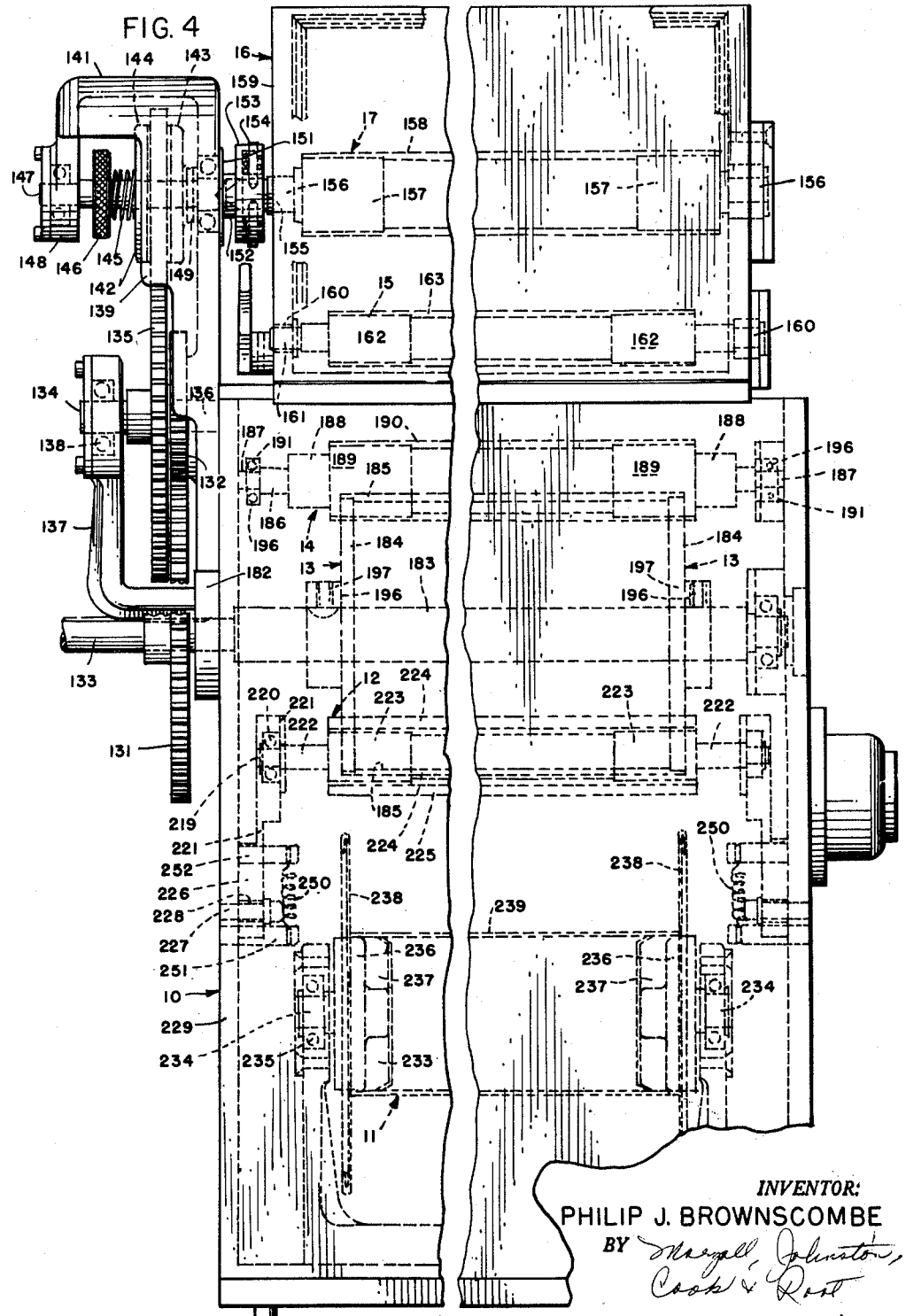
FIG. 4 is a broken, front elevation of the image reproduction section or camera section showing the essential components of the camera section inside the camera housing.
Figure 5:
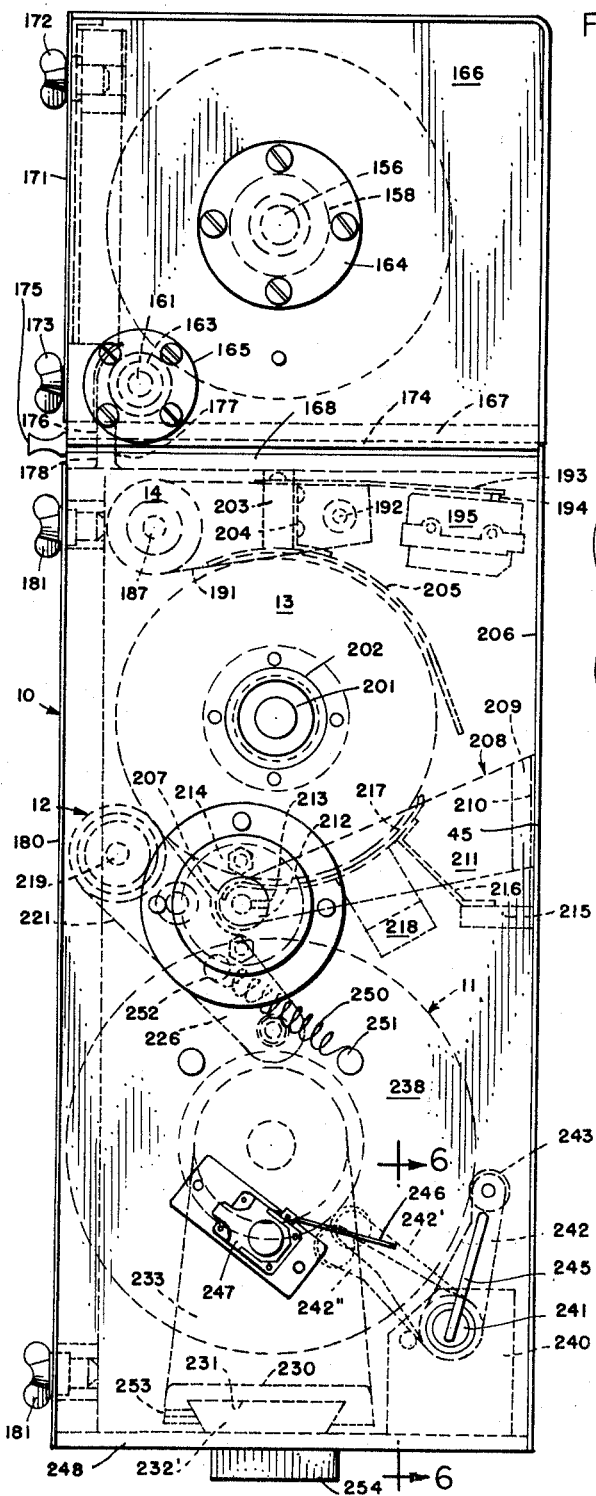
FIG. 5 is a side elevation of the camera section showing the essential components of the camera section inside the housing.
Figure 6:
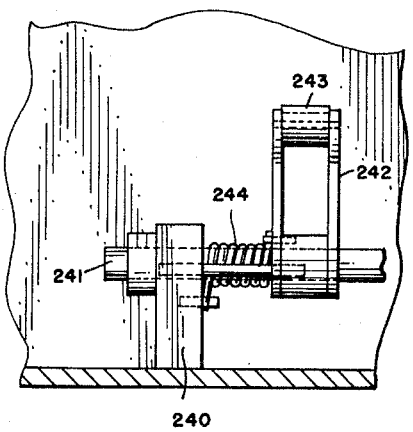
FIG. 6 is a fragmentary front elevation of a roll diameter feeler mechanism in the camera section.

Referring to FIGS. 4 and 5, which illustrate the details of the camera section of the machine, the spur gear 131 meshes with and drive the spur gear 132 attached to the shaft 134. The shaft 134 also has attached thereto a spur gear 135 positioned next to the gear 132. The shaft 134 is rotatably journalled in bearings 136 and 138, the latter being mounted on the arm 137.

The gear 131 rotates gears 132 and 135, and the latter gear rotates the gear 139. The latter gear is the gear drive for the magazine section of the camera. The drive for the magazine section taken from the gear 139 is a slip-type drive designated generally by the numeral 142. The slip clutch drive is supported on the bracket arm 141 and comprises a pair of discs 143, 144 on opposite sides of the gear 139. The disc 144 is splined on shaft 147 and is urged by the spring 145 situated between it and the knob 146 into contact with the face of the gear 139. The amount of pressure exerted by the spring 145 may be adjusted by threading the knob 146 on the threaded portion of the shaft 147. The shaft 147 is journalled at one end in the journalled bearing 148 supported on the arm 141. The hub of the disc 143 is connected by pin 149 to the shaft 147. The driving of the discs 144 and 143 by the gear 139 causes the shaft 147 to rotate. When the resistance to rotation exceeds a predetermined value adjustable by changing the pressure of the spring 145, slipping occurs between the face plates of the discs 143 and 144 and the faces of the gear 139.

The shaft 147 is journalled in a ball or roller bearing 151 of the supporting arm 141. The end of the shaft 147 comprises a hollow socket forming portion 152 into which extends the end 155 of the axle of the roller 17. The end 155 of the axle is releasably locked with shaft 147 by means of a releasable coupling 153 integral with shaft 147, which coupling is a cylindrical member having a plurality of radially inwardly extending pins 154 adapted to be seated in sockets in the end 155. These pins are spring-urged to keep them seated in the sockets, but the pins are retractable so that the roller 17 can be disconnected from the drive shaft 147.

The roller 17 comprises a shaft portion 156 rotatably journalled in the side wall 159 of the housing comprising the magazine section 16. The journalled segment 156 has a cylindrical segment 157 forming a round end member about which the tubular, cylindrical segment 158 of the roller 17 is mounted.

The roller 15 is freely rotatably journalled in the magazine section 16 with the end of its shaft 161 journalled in the bushing 160. The shaft 161 terminates in an enlarged cylindrical segment 162 about which is mounted the tubular, cylindrical segment 163 to make up the roller 15. The opposite ends of the rollers 15 and 17 are journalled in journal bearings 164 and 165, respectively, which are monuted on the side wall 166 of the magazine section 16. The magazine section 16 is a six-sided rectangular enclosure having a front panel 171 removably held in the framework of the magazine section by means of wing bolts 172 and 173. There is slidably mounted at the bottom of the magazine section a plate 174 having a pull handle 175. The bottom panel 167 of the magazine section has an elongated slot 176 which lines up with an elongated slot 177 in slidable plate 174 and an elongated slot 178 in the top panel 168 of the camera section. The film passing from the camera section into the magazine section passes through the slots 176–178. Should it be desired to remove the magazine section from the camera section before all of the film in the camera section is exposed, the plate 174 is pulled outwardly by means of the pull handle 175 so that it draws with it the film in its slot 177. This film can then be cut so that the magazine may be removed from the camera section. Another magazine may then be placed in the camera section and the film threaded over the roller 15 and wound on the roller 17 of the new magazine section.

The camera section 10 comprises a six-sided housing of rectangular shape having a front panel 180 detachably mounted on the framework of the camera section by means of wing bolts 181. A journal hub 182 rotatably supports shaft 133 on one side of the housing. Inside the housing of the camera section the shaft 133 has an enlarged segment 183 upon which is supported a pair of spaced disc members 184. A cylindrical tube 185 is mounted over the discs 184 to form a hollow, cylindrical roller mounted on the shaft segment 183. The disc 184 has a hub 196 attached thereto. The hub 196 is fixedly secured on the shaft segment 183 by means of set screw 197. The roller 13, accordingly, rotates with the rotation of shaft 133 and its enlarged segment 183.

The roller 14 in the upper front corner of the camera section 10 comprises stepped shaft segments 186, 187, 188 and 189 forming a stub shaft at each end of the roller 14. A hollow, cylindrical member 190 is fitted over the segment 189 of the stub shafts to form the cylindrical portion of the roller 14. Each segment 187 of the stub shafts is rotatably journalled in a bearing 196 in pivotable arms 191 situated at each end of the roller 14. The arms 191 are pivotally mounted on a shaft 192 mounted in and extending between opposite sides of the housing of the camera section 10. The roller 14 is supported in its normal operating position by the tension in the film or paper passing thereover. One of the arms 191 has a narrow plate 193 extending rearwardly therefrom. When the roller 14 is held in operating position by the tension in the film or paper passing thereover, the plate 193 presses on the button actuator 194 of an electrical switch 195. The electrical switch 195 may be connected in the circuit for the electric motor drive for the motor 50, or it may be connected in an electrical circuit which energizes a warning light, buzzer or the like.

The purpose for this arrangement is either to shut down the operation of the reproduction machine or actuate a warning signal in the event there is a malfunction in the camera section or in the event the film supply has become exhausted whereby the tension in the film being carried across roller 13 is insufficient to support the roller 14, in which case the roller 14 pivots downwardly, raising the arm 193 and deactivating the switch 195.

The end segment 201 of the shaft 133 is journalled in journal hub 202 mounted on the side of the housing shown in FIG. 4. There is mounted along the upper side of the camera section 10 a bar 203 which is situated between the arms 191. This bar 203 has a bracket 204 upon which is mounted an arcuate plate 205 extending substantially along the length of the roller 13. The plate 205 serves the dual function of guiding the film over the roller 13 during the threading of the film in the camera section and also of serving as a light shield to preclude exposure of the film to stray light admitted through the opening 45.

The opening 45 in the wall 206 is normally covered or closed by a shutter designated generally at 208. This shutter comprises a pair of arms 211 situated at each side of the camera housing and a plate 210 extending between said arms. The tabs or flanges 209 at each end of the plate 210 are attached to the arms 211.

The arms 211 are fixedly mounted on a shaft 212 which is rotatably journalled in the camera section 10. A set screw 213 connects the shaft 212 with a rotary solenoid 214 mounted on the side of the camera housing shown in FIG. 4. When the rotary solenoid is energized, it rotates, causing the shaft 212 to rotate and lift the arms 211. This raises the shutter 208 to a position where the top edge of the plate 210 abuts against the arcuate plate 205. The solenoid 214 is ordinarily energized at the same time that the electrically operated clutch 125 is energized so that the camera section opens simultaneously with the initiation of the camera drive.

The side 206 of the camera section 10 has a bar 215 extending therealong. This bar 215 supports one or more bracket members 216, which, in turn, support an arcuate plate 217 positioned in proximity to the lower surface of the roller 13. The arcuate plate 217 has the same function as the arcuate plate 205. It is supported additionally by brackets 218 mounted on opposite side walls of the housing of the camera section 10. The plate 217 has a downwardly curved edge 207 to prevent the light-sensitive paper or film from passing under the shaft 212 when it is being threaded through the camera section.

The roller 12 rides on and is rotatably driven by the roller 13. It comprises a pair of stub shafts 219 rotatably journalled in bearings 220 in arms 221 situated at opposite sides of the camera section 10. The stub shafts 219 have stepped segments 222 and 223. A cylindrical tube 224 is pressed over the segments 223 to form the cylindrical portion of the roller 12. The cylindrical tube 224 preferably is covered with a rubber coating 225 to provide good contact on the film at the nip of rollers 12 and 13.

The segment 226 of the arm 221 is offset with respect to the outer portion of the arm 221 and has a bushing 228 for mounting the arm 221 pivotally about the pin 227 which is screw threaded into the side plate 229 in the camera section 10.

The side plate 229 also has threadedly mounted therein a pin 251. A similar pin 252 is threadedly mounted in the arm 221. The two pins are interconnected by a tension coil spring 250 which urges the arms 221 in a clockwise direction as viewed in FIG. 5 to hold the roller 12 against the surface of the roller 13.

The unexposed film supply is provided on the spool 11. The spool 11 is mounted in the camera section by a pair of mounting members having a base 230 slidably mounted by means of a dovetail 231 on a tapered plate 232 attached to the bottom panel of the camera section 10. Each mounting member for the spool 11 has an upwardly extending arm 233 which rotatably supports the stub shaft 234 in roller bearings 235.

The supply spool 11 comprises a disc-shaped flange 238 at each end, which flanges 238 has a recessed cylindrical segment 237 which is removably fitted over a hub disc 236 on the stub shaft 234. The remaining portion of the spool 11 comprises a cylindrical tube 239 tightly fitted about the cylindrical wall of the recessed segment 237, forming a hollow tube with end discs about which is wound the film or light-sensitive paper to be exposed in the camera section.

The base 230 is releasably locked upon the tapered plate 232 by a set screw 253. A spool 11 is mounted on stub axles 234 by unlocking the set screw 253 and sliding one of the supporting arms 233 toward the side of the camera section 10. The spool is then mounted over one of the disc cups 236 and the previously moved supporting arm 233 is slid until both of the disc cups 236 are inside the recessed segments 237 of the spool 11. The set screw is then again locked.

The camera section 10 has in a lower corner thereof, intermediate the sides of the camera section a base plate 240 attached to the bottom 246 of the camera section 10. This plate 240 has a shaft 241 rotatably journalled therein. The shaft 241 has a spring 244 mounted thereabout for the purpose of urging the arm 242 and its roller 243 against the film or light-sensitive paper on the supply roll 11. The arm 242 is attached to the shaft 241 and the latter is rotatably journalled in the plate 240 and in the side of the camera section 10. As the roll of film or light-sensitive paper on the spool 11 is used, the arm 242 pivots in a counterclockwise direction as viewed in FIG. 4. The shaft 241 carries an arm 245 located on the outside of the camera section 10. The arm 245 pivots with the shaft 241 and is positioned so that it will contact the switch arm 246 of a switch 247 mounted on the side of the camera section 10. Arm 242 pivots to the position indicated by numeral 242', which will fall past the film or light-sensitive paper remaining on the spool 11 to the position indicated by the numeral 242" under the urging of the spring 244. The arm 245 will then move switch arm 246 to close switch 247. This switch may be mounted in the machine circuit either to deactivate the entire machine or to activate a warning signal such as a light or buzzer to warn the operator that the film supply is about exhausted.

The bottom plate 248 has a bar 254 attached thereto. The bar 254 rides on a pair of flat bottomed rollers 255 (FIG. 1) which are rotatably supported in bearings 256, 257 mounted on a support plate 258. This mounting of the camera section 10 on the rollers 255 permits its lateral shifting to compensate for a lateral displacement of the reflected image from the mirror 6 on the one hand and the mirrors 8 and 9 on the other hand. One means for achieving this lateral shifting is disclosed in my copending application filed concurrently herewith. The shifting may be done manually, however, if desired.

When the machine is turned on, the drum 18 rotates and the light tubes 23 are lit. The shutter 25 is adjusted manually to the proper slit width, and the frame 7 is pivoted to position the mirror 6 or the mirror 9 in front of the lens 5, depending on whether a right-reading or a reverse reading reproduction is desired. The entire camera 10 is shifted sideways upon changing the mirror system to compensate for the lateral displacement of the reflected image when changing from a right-reading to a reverse reading system.

Paper or other sheeting containing copy to be reproduced is pushed along the feed board 2 until it is picked up between the nip of the rotating drum 18 and the roller 19. As the paper passes into exposure chamber 3, there preferably is provided a switch actuating mechanism adjacent the roller 19 which closes a switch to energize the electrically operated clutch 125 for the camera drive and to also energize the rotary solenoid 214 to open the shutter 208. A suitable mechanism for this purpose is disclosed in my copending application Ser. No. 134,878 filed concurrently herewith, now U.S. Patent No. 3,142,-240, issued July 28, 1964.

Upon activating the electrically operated clutch 125, the roller 13 begins to rotate at the same angular velocity as the drum 18. The light-sensitive paper or film F is drawn off the supply roll 11 over rollers 12 and 13. As it travels over roller 13, it is exposed to the image on the copy sheet reflected to it by mirrors 4 and 6 or 8 and 9 through lens 5. Assuming a reduction ratio of 2:1 in size of the copy image to the size of the recorded image, the distance of the folded light path between the copy sheet on the drum 18 and the lens 5 is approximately twice the distance of the folded light path between the lens 5 and the light-sensitive paper or film on the exposure roller 13. This holds true whether the mirror 6 or the mirror 9 is positioned in front of the lens 5. The ratio of the diameter of drum 18 to the diameter of the roller 13 (and correspondingly the arc radius of the copy sheet on drum 18 to the arc radius of the light sensitive paper or film F on roller 13) is 2:1, respectively.

This arrangement gives an accurate recording of the copy on the arcuate copy sheet moving through the exposure section on the arcuate light-sensitive paper or film.

The light-sensitive paper or film F after exposure is drawn over rollers 14 and 15 into the magazine section 16 where the exposed paper or film is wound on roller 17. The roller 17 is driven so as to maintain tension in the paper or film F to keep it in tight contact with the roller 13.

The principle of recording in this invention is one of recording a marking on a copy sheet onto a light-sensitive sheet while both are moving at predetermined, correlated velocities in an arcuate path. By following the principles of the invention, a suitably distortion-free image is reproduced in the recording of a moving image onto a moving light-sensitive sheet.

By the use of a time delay mechanism or another paper operated switch or other suitable means, the circuit for the camera drive and the camera shutter remain energized until the trailing edge of the copy sheet passes through the exposure area on the drum 18. Then the circuit for the drive and the shutter is broken, whereupon the camera operation is stopped and the camera shutter is closed. The copy sheet carries around the drum 18 under belts 27 and returns to the front of the machine.

The foregoing constitutes but one embodiment of the principles of my invention. Other modifications and variations may be employed without departing from the spirit and scope of the invention and the principles thereof, which invention is set forth in the following claims.

The invention is hereby claimed as follows:

1. A reproduction machine comprising a cabinet containing a lighted, image exposure section, an image recording section, power-driven means in said exposure section for passing a sheet with indicia thereon in a curved path through said image exposure section, means including a lens for directing a narrow image from said exposure section to said recording section to record the image at a size different from the size of the image on said sheet, driven means in said recording section for passing a sheet of light-sensitive material with exposure to the narrow image in a curved path at a velocity correlated with the velocity at which the sheet is passed through the exposure section to provide a ratio of the velocity of said sheet passing through said exposure section to the velocity of said sheet of light-sensitive material passing through said recording section, respectively, equal to the ratio of the size of the original image and the size of the recorded image, respectively, the ratio of the arc radius in said curved path of said recording section to the arc radius in said curved path in said image exposure section being equal to the linear reduction ratio of said means including a lens.

2. A reproduction machine comprising a cabinet having an image exposure section, including a rotatably-driven drum adapted to convey a sheet through said exposure section and a housing on a side of said drum containing lighting means and an elongated opening, an image recording section, means including a lens for reducing and directing the narrow image emitted from said elongated opening to said image recording section, drive means for drawing light-sensitive paper over a drum in said image recording section, the ratio of diameters of said drum in said recording section to said drum in said exposure section being equal to the linear reduction ratio of said means including a lens.

3. A reproduction machine comprising a cabinet having a copy exposure section with a rotatably-driven drum adapted to convey a copy sheet through said exposure section, means for lighting said exposure section, an image recording section in said cabinet, means including a lens for reducing and directing the copy image from said exposure zone to said recording section, a roller in said recording section over which light-sensitive paper passes when exposed to the reduced image of said copy sheet, means for driving said roller at an angular velocity equal to the angular velocity at which said drum is rotatably driven, the ratio of diameters of said drum to said roller being equal to the linear reduction ratio of the copy image to the recorded image.

4. A reproduction machine comprising a cabinet having a copy exposure section with a rotatably-driven drum adapted to convey a copy sheet through said exposure section, means for lighting said exposure section, an image recording section in said cabinet, means including a lens for reducing and directing the copy image from said exposure zone to said recording section, a roller in said recording section over which light-sensitive paper passes when exposed to the reduced image of said copy sheet, a first pulley rotatable with said drum, a second pulley rotatable with said roller, a metal band drive over said pulleys, means for maintaining tension in said band, said pulleys being of equal diameters whereby said first pulley drives said second pulley and said roller at an angular velocity equal to the angular velocity of the rotatably-driven drum, and the ratio of diameters of said drum to said roller being equal to the linear reduction ratio of the copy image to the recorded image.

5. A reproduction machine comprising a cabinet having a copy exposure section with a rotatably-driven drum adapted to convey a copy sheet through said exposure section, means for lighting said exposure section, an image recording section in said cabinet, means including a lens for reducing and directing the copy image from said exposure zone to said recording section, a roller in said recording section over which light-sensitive paper passes when exposed to the reduced image of said copy sheet, a first pulley rotatable with said drum, a second pulley rotatable with said roller, a metal band drive over said pulleys, a spring-biased idler pulley riding on said band for maintaining tension in said band, said pulleys being of equal diameters whereby said first pulley drives said second pulley and said roller at an angular velocity equal to the angular velocity of the rotatably-driven drum, and the ratio of diameters of said drum to said roller being equal to the linear reduction ratio of the copy image to the recorded image.

6. A reproduction machine drive for a drum for conveying a copy sheet through the machine and a paper camera for recording the projected image of said copy sheet comprising a motor-powered drive, a pulley on said drive, a rotatably-mounted drum, a shaft on said drum, a second pulley on said shaft, a continuous belt mounted on said first and second pulleys, a third pulley rotatable with said drum, a paper camera, a roller rotatably mounted in said camera, a shaft on said roller, a fourth pulley on said last-mentioned shaft, a metal band drive mounted on said third and fourth pulleys, means for maintaining tension in said metal band, a shaft driven by said fourth pulley, an electrically-operated clutch on said last-mentioned shaft, a shaft driven by said clutch, an exposure roller in said paper camera driven by said last-mentioned shaft, means for supplying light-sensitive film to said exposure roller, a magazine roller for winding film exposed on said exposure roller, and slip drive means drivingly connecting said exposure roller and said magazine roller.

7. A reproduction machine drive for a drum for conveying a copy sheet through the machine and a paper camera for recording the projected image of said copy sheet comprising a motor-powered drive, a pulley on said drive, a rotatably-mounted drum, a shaft on said drum, a second pulley on said shaft, a continuous belt mounted on said first and second pulleys, a third pulley rotatable with said drum, a paper camera, a roller rotatably-mounted in said camera, a shaft on said roller, a fourth pulley on said last-mentioned shaft, a metal band drive mounted on said third and fourth pulleys, means for maintaining tension in said metal band, a shaft driven by said fourth pulley, an electrically-operated clutch on said last-mentioned shaft, a shaft driven by said clutch, and an exposure roller in said paper camera driven by said last-mentioned shaft.

8. A reproduction machine drive as claimed in claim 7 wherein said third and fourth pulleys are of equal diameter and said drum and roller rotate at equal angular velocities.

References Cited by the Examiner
UNITED STATES PATENTS

| | | | |
|---|---|---|---|
| 1,539,322 | 5/25 | Morton | 88—24 |
| 2,133,537 | 10/38 | Carpenter | 88—24 |
| 2,472,931 | 6/49 | Yohn. | |
| 2,823,579 | 2/58 | Fitter | 88—24 |
| 2,940,358 | 6/60 | Rosenthal | 95—1.7 X |
| 3,010,361 | 11/61 | Pfaff | 88—24 |

FOREIGN PATENTS 795,087    5/58    Great Britain.

NORTON ANSHER, *Primary Examiner.*

EMIL G. ANDERSON, *Examiner.*